Figure 1A:
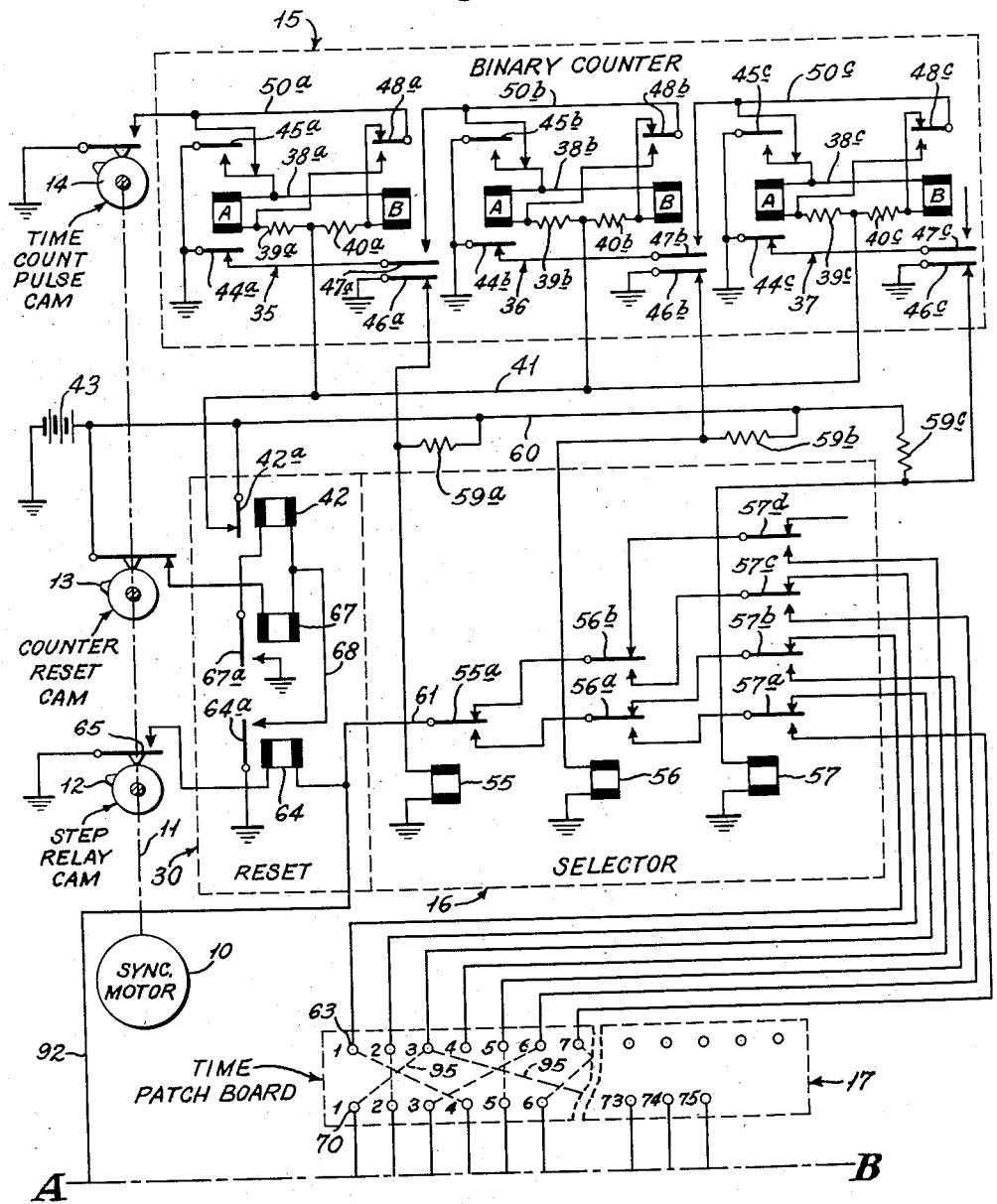

INVENTORS
Donald J. McClure
and Eugene T. Warner
BY
Burns, Doane, Benedict & Lyons
ATTORNEYS

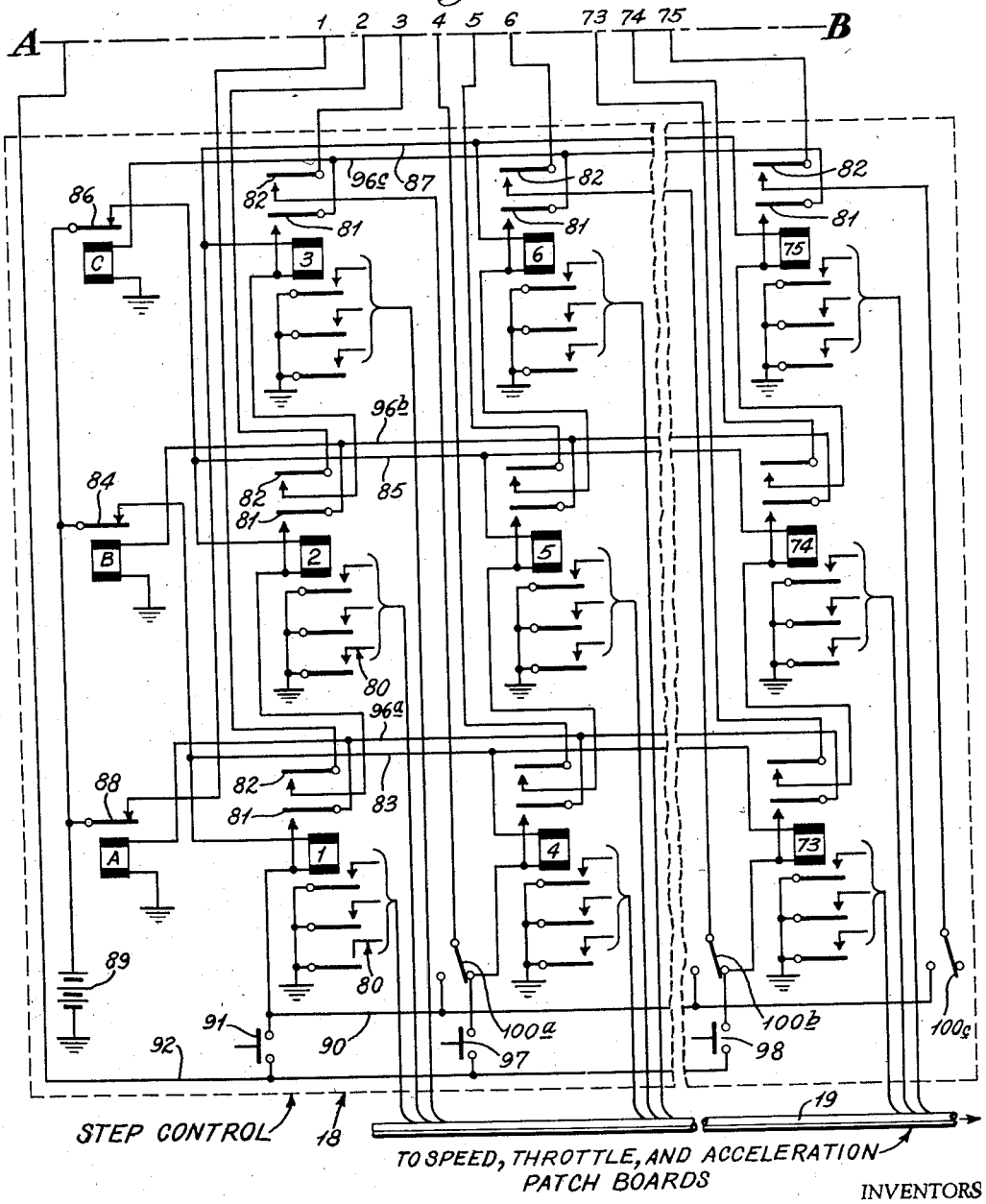

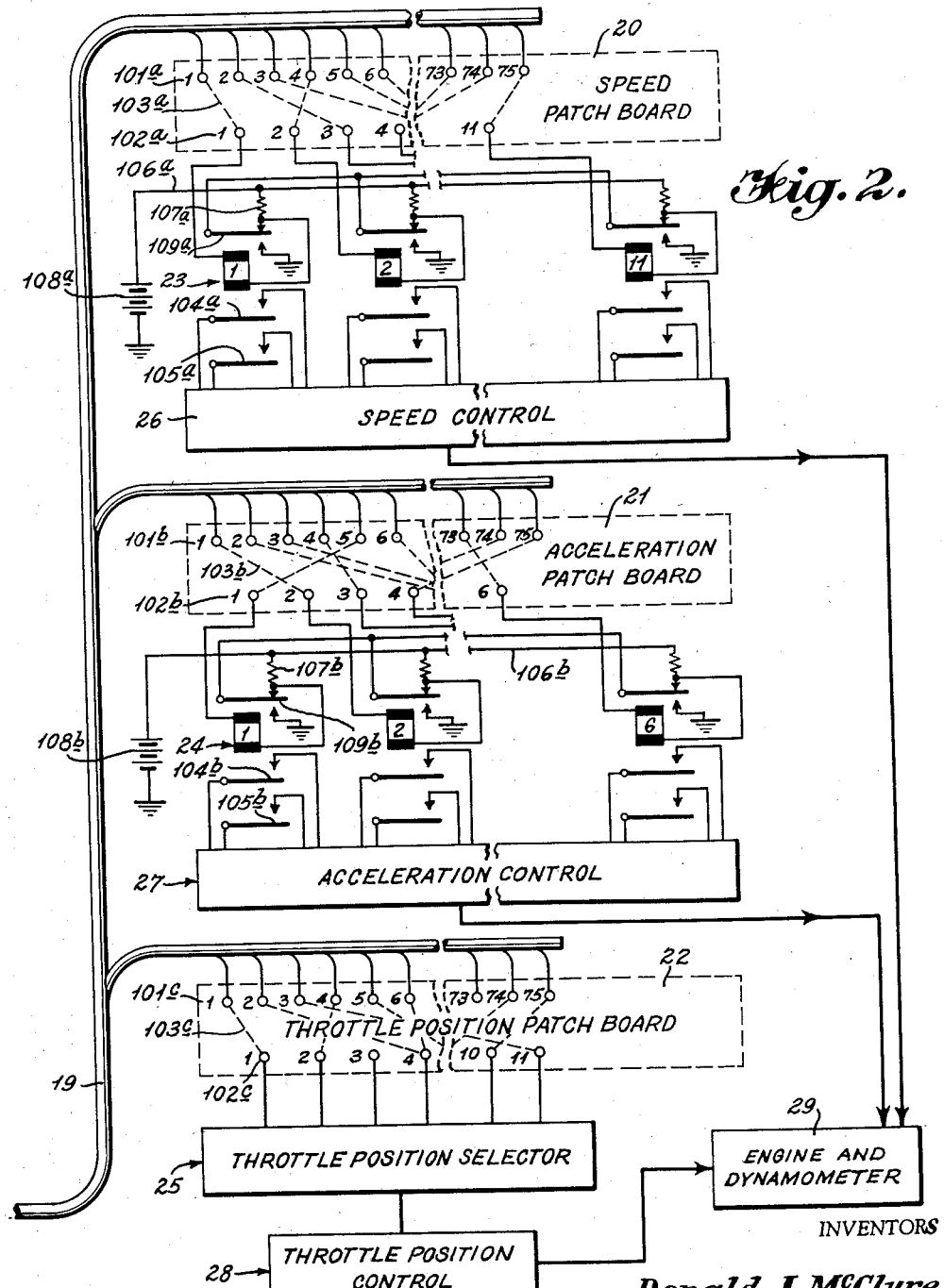

United States Patent Office 2,879,842
Patented Mar. 31, 1959

2,879,842

TIME PATTERN CONTROLLER

Donald J. McClure and Eugene T. Warner, Bradford, Pa., assignors to Kendall Refining Company, Bradford, Pa., a corporation of Pennsylvania Application March 21, 1957, Serial No. 647,702

19 Claims. (Cl. 161—1)

This invention relates to pattern controllers, and, more particularly, to a time pattern controller for sequentially selecting a plurality of different discrete levels of a condition of a device to be controlled and for maintaining that level for a selectable time interval.

Various types of time pattern or time programming devices have been used for a great variety of purposes. Generally speaking, the type of pattern control to which the present invention relates involves changing one or more variable conditions of a controllable device in a predetermined manner during the course of a complete program. For instance, when an engine, or a lubricant for an engine, is to be tested, it is desirable to simulate as closely as possible the various changes in operating conditions of the engine which would be experienced in road operation. For exact simulation, a continuous type of control would be necessary, but the mechanism for such a control would have to be quite complex and include a basic control device such as a complex mechanical cam, or series of cams, a magnetic tape, or the like. Where the resolution (that is, the ability to produce steps of short time duration relative to overall program time) of such a device has to be high and the length of the program is long, the controlling cam must be very large or the tape very long. At least a majority of the characteristics of the complete program must be known ahead of time in order that the cam or tape can be made. Further, whenever the program, or even a part of it, is to be changed, a new cam must be prepared or at least a portion of a tape must be changed. These basic control devices are difficult to produce originally, may not maintain their original characteristics indefinitely, and are difficult to reproduce.

An alternative to continuous control is "step-wise" control in which the variable is changed by finite steps, with the variable maintained constant during the time of each step. Such a control may be made to approach continuous control by use af a large number of short-time steps. While step control can be achieved by use of cams or tapes, the problems of resolution and length of the control surface still remain. Moreover, as in continuous control, the entire tape or cam must be constructed ahead of time and the complete characteristics of the program must be known before the control system can be designed.

The present invention is intended to permit construction of the basic control device of a pattern controller without necessitating there be complete fore-knowledge of all the characteristics of the program. For this purpose, the use of cams, tapes, and the like, is avoided, with the attendant advantage of freedom from the obliterating effects of wear and from the difficulty of production of the basic control device.

The invention, generally speaking, comprises a timing device which establishes a basic time period, a switching device controlled by the timing device, and a selector device sequentially operable to establish in step form the various discrete levels of the operating characteristic of the controlled device, the switching device being operable with an energizing means to control the selector device to establish one step of the program for a selectable multiple of the time period, then automatically to change the operation to set up the next step, etc., for the entire pattern or program. In order to facilitate selection of the time periods of the various steps of the program, the switching device is preferably connected to a time patch board, which in turn is connected to the selector device. Separable connectors on the patch board may be connected to select the time multiple of the basic time period at which the conditions of any selected step, and all steps, are to be effected.

With the apparatus of the invention only a limited amount of knowledge of the program is necessary for design of the apparatus. This required knowledge consists of the maximum number of steps that are to be contained in any cycle of the device; the maximum and minimum amount of time that any step is to take; and, the maximum number of discrete levels that the condition of the device to be controlled may take. With this knowledge the apparatus may be constructed with units of time, number of steps in the program or cycle, and levels of each variable condition (if more than one is to be controlled) presented on a patch board. Then, when a specific program is to be set up, these characteristics may be put in the system by making the proper connections on the patch boards. The connections may readily be changed to change the entire program, or any part of it, at any time, yet the labor of constructing a new tape or cam is avoided.

The object of the invention, then, is to permit the setup of an entire program of variation of a condition of a device to be controlled, which setup is extremely flexible to permit change in the steps of the program or to permit the entire program to be changed, and the basic apparatus of which may be constructed without complete knowledge of all the characteristics of any program which is to be effected.

Though the preferred embodiment of the invention will be described in conjunction with a dynamometer for controlling a plurality of conditions of an engine under test, it will be appreciated that the invention may be used for control of other types of device, and may even be advantageous when only one condition of the controlled device is to be varied.

The invention will now be more fully described in conjunction with a preferred embodiment thereof, shown in the accompanying drawings.

In the drawings:

Figs. 1A and 1B, taken together, constitute a schematic diagram of the main elements of the time pattern controller. When the two sheets are laid end-to-end with the respective lines A—B in registration, the two figures form a schematic of all the apparatus of the invention, with the exception of the apparatus for controlling the conditions of the test engine; and, Fig. 2 is a schematic diagram of the apparatus for controlling the various variable conditions of the engine.

Referring to the drawings, the apparatus, generally speaking, includes a synchronous motor 10 which drives a shaft diagrammatically shown at 11, which shaft carries a plurality of cams. The cams include a step relay cam 12, a counter reset cam 13, and a time count pulse cam 14. The apparatus further includes a binary counter 15, which is controlled by the time count pulse cam. The binary counter in turn controls a selector 16 which provides pulses to a plurality of terminals constituting one set of terminals on a time patch board 17. The selector 16 and binary counter 15 together constitute a switching device. The other set of terminals of the time patch board, to which the terminals of the first-mentioned set are connected by means of separable connectors, are themselves connected to a step control 18. The output leads of the step control are connected into a cable 19 which is connected to a plurality of patch boards, one for each of the conditions of the device to be controlled. As shown in Fig. 2, cable 19 is connected to speed patch board 20, acceleration patch board 21, and throttle position patch board 22.

One set of the terminals of each of the speed, acceleration, and throttle position patch boards, is connected to cable 19, while the other set of each patch board is connected to a position selector apparatus, respectively, 23, 24, and 25. These selectors in turn are connected to a speed control 26, an acceleration control 27, and a throttle position control 28. These various controls constitute parts of a conventional dynamometer (not shown) to control or furnish a load for a test engine 29, in conventional dynamometer control fashion.

The binary counter 15 and selector 16 are reset by a reset device 30 whose function will be later explained.

Referring back to Fig. 1-A, the synchronous motor drives cam 14, which is of the single lobe variety, to provide a periodic time interval which is constant throughout operation of the device. The time intervals are counted by the binary counter, for each rotation of the time count pulse cam, and the counter controls operation of the selector to furnish ground connection sequentially to the numbered terminals of the upper set of terminals on time patch board 17. As will be explained, when ground is connected from the appropriate terminal of the lower set on the time patch board to the step control 18, a relay of a set of step relays is actuated to close ground circuits to the corresponding leads of cable 19.

Grounding of these leads of cable 19 causes grounding of terminals of the various speed, acceleration, and throttle position patch boards connected to the terminals of these step relays. These ground circuits are connected to relays of the speed selector, the acceleration selector, and the throttle position selector to cause energization of the corresponding relays thereof to effect changes in the various control circuits. Thereby, the dynamometer, which is composed of the control circuits, causes corresponding changes in the characteristics of operation of the test engine 29.

The binary counter 15, in the illustrated embodiment, is composed of three binaries 35, 36, and 37, each comprised of a pair of relays indicated as A and B. The binaries are connected in conventional binary chain arrangement, with input to the first binary being controlled by the time count pulse cam, and inputs to the succeeding binaries obtained from the preceding binary. One side of each of binary relay coils A and B of each binary are connected together by a common lead 38a, 38b, and 38c, respectively. The other side of binary relay A of each binary is connected through the series combination of resistors 39a—39c and 40a—40c to the other side of the corresponding B binary relay coil. The connection between the two resistors for each binary is connected to a common lead 41 which is in turn connected through the normally-closed contacts 42a of an interrupter relay 42 forming part of reset 30, whose function will later be described, to the positive side of a power supply source, indicated as battery 43. The negative side of battery 43 is grounded.

The contact sets for the various corresponding binary relays are identical, with the A relays provided with normally-closed contacts 44a—44c, and make-before-break contacts indicated at 45a—45c.

The B relays of the binaries have normally-closed contacts 46a—46c, normally-open contacts 47a—47c, and double-throw contacts 48a—48c.

The normally made contacts of the made-before-break set of the binary relays A provide connections between the common leads 38a—38c to leads 50a—50c. Lead 50a is connected to the normally-open contacts of the time count pulse cam 14, with the swinger of the pulse cam connected to ground, so that ground is applied to lead 38a of the first binary when the time count pulse cam is first closed. The corresponding lead 50b of the second binary is connected to the normally-open contacts 47a of binary coil B of the first binary. The swinger of these contacts is connected through the normally-closed contacts 44a to ground. The lead 50c of the third binary is correspondingly connected through the normally-open contacts 47b and the normally-closed contacts 44b of the second binary to ground.

The swingers or moving contacts of contact sets 45a—45c are connected to ground. The swingers of contact sets 48a—48c are connected to common leads 50a—50c, and the contacts with which they are normally made are connected directly to the high sides of the corresponding relay coils B. The normally-open contacts of these contacts sets are connected to the high sides of the corresponding relays A.

The selector 16 is composed of a plurality of relays designed to provide unique paths sequentially to the first-mentioned set of terminals of the time patch board. The selector relays are numbered 55, 56, and 57, and all have contact sets of the double-throw variety. Relay 55 is of the single pole type, with its contacts labelled 55a, while relay 56 is of the double-pole type with contacts labelled 56a and 56b, and relay 57 of the quadruple pole variety with contacts labelled 57a—57d. The selector relays 55—57 have one side of each of their coils connected to ground, while the other side is connected through a resistor 59a—59c, respectively, to a common lead 60, which is connected to the positive side of battery 43. The junctions between the resistors 59a—59c and the high sides of the selector relay coils are connected through the normally-closed contacts of the binary counter 46a—46c to ground, so that the relays 55—57 are normally grounded at both sides and are therefore not operated. However, when the corresponding B relays of the binaries are energized, the ground connections for the high sides of the selector coils are broken, and the relays energize.

The contact sets of the selector relays are connected in pyramidal fashion, with the input of the contact arrangement being connected to a ground lead 61 which is grounded through means to be described hereinafter. The normally-closed contact and the normally-open contact of pole 55a are connected, respectively, to the poles 56b and 56a, while the normally-closed and the normally-open contacts of pole 56a are connected to poles 57b and 57a, and the normally-closed and the normally-open contacts of pole 56b are respectively connected to poles 57d and 57c. The output terminals of the pyramidal contacts of the selector are connected to terminals 63 of the time patch board, one of the output contacts being connected to each of the terminals, and the connections being made in such manner, that, during operation of the selector, a ground connection is first made to the first or left-most terminal of the set 63, then to the next adjacent terminal, and so forth, proceeding sequentially to the right and with increasingly higher numbered terminals.

Ground is connected to the input lead 61 of the selector pyramidal arrangement of contacts through the series combination of the coil 64 of a pulse repeating relay and the normally-open contacts 65 of the step relay cam 12. The step relay cam and the time counter pulse cam 14 are so phased that the contacts of the former are closed immediately after the contacts of the latter are opened.

In operation of the selector 16 and the binary counter 15, when the time count pulse cam 14 first closes its contacts, a ground connection is made through the contacts to common lead 50a and through contacts 45a to the low side of binary relay A of the first binary 35. The A relay thus energizes, but the B relay remains de-energized because its contacts 48a place a ground connection on its high side. Then when the pulse cam opens its contacts, the A relay remains energized because of a holding circuit completed through its make-before-break contacts 45a, and the B relay energizes because of the removal of the ground connection from its high side. When the B relay energizes, contacts 46a thereof open to take the ground connection off the high side of selector relay 55 and to permit that relay to energize. After the selector relay 55 energizes, the contacts 65 of the step relay cam are closed to complete a connection between ground and the first terminal of the set 63 on the time patch board 17, through the pulse repeating relay 64, pole 55a of selector 55, pole 56a, of selector relay 56, and pole 57b of selector relay 57. The purpose of this connection will be later explained.

When the time count pulse cam again closes its contacts, a ground connection is made through contacts 48a of the B binary relay to the high side of the A relay, thus de-energizing the A relay. Contacts 44a of the A relay close to complete the circuit from ground through contacts 47a of the B relay to common lead 50b and common lead 38b of the second binary 36. Thereby, the A relay of the second binary is energized.

When the pulse cam again opens its contacts, the ground connection is removed from the low side of the B relay of the first binary to cause that relay to drop out, thereby to de-energize the first selector relay 55, and at the same time, to permit the B relay of the second binary 36 to energize. This latter action results in energization of the second selector relay 56. Hence, a circuit from ground through the contacts 65 of the step relay cam, the pulse repeating relay 64, pole 55a, pole 56b, and pole 57c to the second terminal of the set 63 of the time patch board is completed.

A further sequential operation of the counter and the selector need not be explained, since it will be evident from the above. Suffice it to say that a ground connection is made to the next sequential terminal of the set 63 each time that the time count pulse cam is opened. The time interval between each change in terminal of the time patch board to which ground is connected is determined by the period of rotation of shaft 11 and the synchronous motor 10, and may be, of course, of any value. For instance, the shaft may complete one rotation every three or five seconds, if desired.

It will be evident that the binary counter chain could be extended as far as desired, as could the selector 16, so as to provide any desired number of terminals on the time patch board to which ground might be sequentially connected. Thereby, any number of selected intervals of time could be available at the time patch board.

It will be noted that one, and only one, circuit is connected through the selector pyramidal arrangement of contacts for any condition of the binary counter and the selector.

The reset device generally indicated at 30, and which includes the interrupter relay 42 and the pulse repeating relay 64 already referred to, also includes a prime relay 67 forming with the interrupter relay 42 a reset pair. The pair have their ground sides connected by lead 68 through normally-open contacts 64a of the pulse repeating relay to ground. The other side of prime relay 67 is connected through the normally-closed contacts of the counter reset cam 13 to the positive side of battery 43, while the corresponding side of interrupter relay 42 is connected through the normally-open contacts 67a of the prime relay to ground.

In operation of the reset device, each time the step relay cam 12 closes its contacts and a circuit is completed through the pyramidal arrangement of selector contacts to a step relay, the pulse repeating relay energizes. The resulting closure of contacts 64a pulses prime relay 67 of the reset pair to cause closure of its contacts 67a. Interrupter relay 42 is held open because both its sides are grounded until the step relay cam opens its contacts 64a. Then the interrupter coil is energized in series with prime relay 67 and its contacts 42a open to open the connection between leads 41 and 60, so that all of the binary relays are de-energized. This action causes de-energization of the selector relays, to return the pyramidal arrangement of the selector to its initial condition. Then, the counter reset cam opens its contacts to open the energizing circuit for prime relay 67 and interrupter relay 42 to reclose contacts 42a. Then, the time count can begin again.

It will be evident that each time a step relay is energized, the counter and selector return to their initial conditions to permit the time count to start from the beginning.

The terminals of the second set 70 of the time patch board are connected, as shown in Fig. 1b, to relays of the step control 18. These relays, which are labelled with the appropriate number of their arrangement in the cycle of operation of the step control, are sequentially operated in the order of numbering. The numbered step relays are arranged in groups of three (shown as vertical columns) which form three horizontal rows. Each row is connected to be controlled by a prime relay, the prime relays being labelled A, B, and C, with the first row being the lowermost, and progressing toward the C prime relay at the top. Any number of groups of step relays may be used, three groups being shown in Fig. 1B, and a break being indicated by dashed lines therein to indicate that the group to the far right may be the last group of the step relays, 73, 74, and 75.

The step relays each have three normally-open sets of contacts 80, labelled for the first and second step relays only in Fig. 1B, connected to the cable 19 and from thence to the speed, acceleration, and throttle position patch boards of Fig. 2. The swingers or poles of these contacts are grounded, so that when the corresponding step relay is energized, a ground connection is made to each one of the control patch boards. Each of the step relays also has a pair of normally-open contacts 81 which complete a holding circuit for the relay when the relay is energized, and a pair of normally-open contacts 82 which prepares an energizing circuit for the next higher relay in the sequence of step relays.

The relays of the A row of the step control each have one side of their coils connected to a common lead 83 which is connected through the normally-closed contacts 84 of the B prime relay, while the B row of step relays have the corresponding coil sides connected to a common lead 85 which is connected to the normally-closed contacts 86 of the prime relay C, and the C row of step relays have their corresponding coil sides connected to a common lead 87 which is connected to the normally-closed contacts 88 of prime relay A. The aforementioned contacts of the prime relays have their poles or swingers connected to the positive side of a voltage source, such as the battery 89, the negative side of the battery being grounded. The other side of the first step relay is connected to a common lead 90 which in turn is connected through a start switch 91, of the push button type, to a common lead 92. Lead 92, in Fig. 1A, is connected to lead 61 which, as indicated above, is grounded every time the step relay cam closes its contacts 65. Thereby, the first step relay is energized when the start switch 91 is depressed and the step relay cam closes its contacts 65. This occurs, of course, at the beginning of operation of the apparatus.

The second step relay has its ground side connected through the closed contacts 82 of the first step relay to the first of terminal set 70 of the terminals on time patch board 17. The terminals 70 may be connected to the terminals 63 of the time patch board by separable connectors 95, shown in dashed-line form in Fig. 1A, which may be of the plug variety. Any desired arrangement of connectors 95 may be made to achieve the desired timing of operation of the step relays. When the first terminal of set 70 of the time patch board is grounded, which will be after three closures of the pulse cam 14, as shown in Fig. 1A, a ground connection is made to the low side of the second step relay from the selector switch pyramidal arrangement of contacts, through the time patch board, and through the now-closed contacts 82 of the first step relay. The second step relay then energizes.

The succeeding step relays are connected to be energized in similar manner, with a ground connection made for each succeeding relay through the normally-open contacts of the preceding relay and the numbered terminal of the set 70 of the time patch board corresponding to the number of the step relay. The step relays are then energized in sequence, as indicated above, with a new step relay being energized each time a ground connection is made through the time patch board 17.

Referring again to the prime relays of the step control 18, the low sides of the prime relay coils A—C are connected to ground and the high sides are connected to common leads 96a—96c, respectively. These common leads are connected in common to all of the poles of the contact sets 81 of the group of relays corresponding to the prime relay. That is, lead 96a is connected to the pole of contact set 81 of each of the A group of relays, while leads 96b and 96c are connected to the corresponding contacts of the B and C rows of step relays.

It will be evident from the above that, whenever one of the step relays is energized by the step pulse produced by the step relay cam 12, its corresponding prime relay coil has its high side held near ground potential by the contacts 81, because of the low potential across pulse repeating relay 64. The potential across this prime relay coil is therefore too low to energize the relay. When the step pulse terminates, because of cam 12 opening its contacts, the low potential connection to contacts 81 is removed and the prime relay is then in series with its step relay, has sufficient potential across its coil, and energizes. The low potential connection to each of the prime relays through contacts 81 of the step relays is achieved by reason of the fact that the coil of pulse repeating relay 64 is of very low resistance. Therefore, when step relay cam 12 closes its contacts lead 61 is very close to ground potential. When the next prime relay in the sequence is energized after termination of the next step pulse the circuit from the high side of battery 89 is interrupted by the prime relay contacts 84, 86, and 88, respectively, so as to release the preceding step relay and hence its corresponding prime relay.

The normally-open contacts 82 of each of the relays in row C, are connected through a double-throw recycle switch 100a, 100b, to the ground side of the next sequential step relay. However, when one of the recycle switches is changed to its alternate position, contact is made from the corresponding contacts 82 of the relays in row C to lead 90, so that a ground circuit is made back to the first step relay. The last step relay, indicated in Fig. 1B as the 75th step relay, has only one operative position of its recycle switch 100c, so that the switch is operative only when in the recycle position to connect the contacts 82 of the 75th step relay to lead 90.

The recycle switches, as indicated by the names, operate to restart the sequential operation of the step relays. When switch 100c is thrown to the recycle position, the step control will step through the entire 75 steps of its sequence and then begin over with the first step. When any of the other recycle switches are thrown to their recycle positions, the step sequence will begin over again at the end of operation of the selected group of step relays.

Start switches 97 and 98, connected between the ground sides of the other relays of the A group (shown as the 4th and the 73rd step relays) and the ground lead 92, are provided to permit operation to be started with the corresponding steps, rather than with the first step relay.

Referring now to Fig. 2, when ground is placed by contacts 80 of any one of the step relays on the corresponding lead of cable 19, a ground connection is made to the corresponding one of a first set of terminals 101a—101c of each of the speed, acceleration, and throttle position patch boards, 20—22. The contacts of terminal sets 101a—101c are numbered in the drawing corresponding to the numbering of the step relays, so that the ground connections are made to the numbered terminals in sequence in accordance with operation of the step control. These ground connections may be made to a second set of terminals 102a—102c through separable connectors 103a—103c, of construction corresponding to the separable connectors 95 of the time patch board.

The second sets of terminals 102a—102c of the patch boards 20—22 are connected to relays constituting the speed selector 23, the acceleration selector 24, and the throttle position selector 25. Each one of these selectors includes a plurality of control relays, (shown only for the speed and acceleration selectors) labelled with numbers corresponding to the number of different levels of the condition of the engine which are possible of attainment. For instance, as indicated by Fig. 2, the speed and acceleration characteristics are capable of attaining eleven and six different discrete levels, respectively, though of course they may be any desired number. When any one of these selector relays of the sets 23—25 is energized, the corresponding contact sets 104a—104b, and 105a—105b, are closed, to establish connections in the control circuits 25—27 to set up the corresponding discrete level of each of the controlled characteristics of the engine. The speed control, the acceleration control, and the throttle position control need not be further described herein, because they may be of conventional form well-known in the dynamometer field, but they may include tapped potentiometers fed by suitable transducers and arranged with their taps brought out to the respective contacts 104a—104b and 105a—105b, the potentiometers being used to control the corresponding characteristics of the engine 29. For instance, for speed control, a tachometer may feed the potentiometer wired to the speed selector.

One side of the coil of each of the selector relays of the sets 23, 24 is connected to a common lead 106a, 106b through a resistor 107a, 107b, respectively. The common leads 106a, 106b are connected, respectively, to one side of batteries 108a, 108b, and the other sides of the batteries are connected to ground. The same side of each relay coil is connected to the normally-closed one of a set of relay contacts 109a, 109b. The swingers or poles of contact sets 109a, 109b are connected in multiple, and the corresponding normally-open contacts are connected to ground. The other sides of the coils of the selector relays are connected to the correspondingly-numbered terminals of the sets 102a, 102b of the condition patch boards. The selector 25 is connected in the same manner as selectors 23 and 24.

When a ground connection is made to each condition patch board, and through the appropriate separable connectors 103a—103c to any of terminals 102a—102c, a ground connection for the corresponding selector relay for each condition is made, so that the relay can energize if none of the other relays of the set is energized. For instance, when the first step relay of Fig. 1A is energized, ground is connected through the relay contacts 80 to each of the first terminals of sets 101a—101c, and through separable connectors 103a—103c, to the first speed selector relay, the second acceleration selector relay, and the first throttle position selector relay, thus energizing all of these relays and completing circuits in the speed control, acceleration control, and throttle position controls to achieve the corresponding levels of these characteristics of the engine.

Since each of the selector relays has its pole or swinger of the sets 109 connected in multiple, when one of these relays is energized its swinger grounds the high sides of the coils of the remaining relays of the set. Thereby all the other selector relays corresponding to that characteristic of the engine are maintained de-energized.

In order to explain the operation of the complete cycle of the time pattern controller, for the illustrated embodiment which controls an engine through a dynamometer, the following table showing the various operations for each important movement of the time count pulse cam is given.

| Sequence | Reaction |
|---|---|
| 1ST REVOLUTION OF CAM SHAFT 11 | |
| 1. Start button 91 depressed and time count pulse cam 14 closes contacts. | 1. Binary relay A of first binary 35 is energized. |
| 2. Time Pulse Cam opens Contacts. | 2. Relay B of first binary energized to allow first selector relay to energize. |
| 3. Step Relay Cam closes contacts 65. | 3. Pulse repeating relay 64 energizes closing contacts 64a, thereby energizing prime reset relay 67 and closing contacts 67a. Also step relay 1 is energized through push button 91 and lead 92. Contacts 80, 81, 82 close, thereby speed selector relay 1, acceleration selector relay 2 and throttle position selector relay 1 are energized (because of position of connectors 103a–103c shown on Figure 2). |
| 4. Step Relay Cam opens contacts 65. | 4. Near ground potential is removed from contacts 81 of step relay 1 and prime relay A energizes, opening contacts 88. Pulse repeating relay drops out. Contacts 64a open and ground is removed from common coil lead of reset relays 67 and 42. Reset relay 42 then energizes, opening contacts 42a which breaks the connection between common lead 41 and battery 43, so the relays of the binary counter 15 and the relays of selector 16 all drop out to reset the counting arrangement. |
| 5. Counter reset cam opens contacts. | 5. Reset relay pair drop out and close contacts 42a re-establishing connection between battery 43 and common lead 41 putting binary counter 15 and selector 16 in "ready to operate" state. |
| 6. Counter reset cam closes contacts and push button 91 is released. | 6. Connection from high side of prime reset relay coil to battery 43 is reestablished. |
| 2ND REVOLUTION OF CAM SHAFT | |
| 1. Time Pulse Cam closes contacts. | 1. Binary relay A of first binary 35 is energized. |
| 2. Time Pulse Cam opens contacts. | 2. Relay B of first binary 35 energized to allow first selector relay 55 to energize. |
| 3. Step Relay Cam closes contacts. | 3. Since the first terminal of terminals 63 is connected to step relay 4, there is not a completed circuit to step relay 2. Hence, no step pulse of current. |
| 4. Step Relay Cam opens contacts. | 4. No reaction because no step pulse has occurred. |
| 5. Counter Reset Cam opens contacts. | 5. No reaction because no step pulse has occurred. |
| 6. Counter Reset Cam closes contacts. | 6. Prime reset relay re-connected to battery. |
| 3RD REVOLUTION OF CAM SHAFT | |
| 1. Time Pulse Cam closes contacts. | 1. Relay A of first binary 35 drops out to pulse relay A of second binary 36. |
| 2. Time Pulse Cam opens contacts. | 2. Relay B of first binary 35 drops out to de-energize the first selector relay 55 and relay B of second binary energizes and energizes selector relay 56. |
| 3. Step Relay Cam closes contacts. | 3. Since the second terminal of terminals 63 is connected to open contacts 82 of step relay 2, there is not a complete circuit to step relay 2 coil, hence no pulse of current. |
| 4. Step Relay Cam opens contacts. | 4. No reaction because no step pulse has occurred. |
| 5. Counter Reset Cam opens contacts. | 5. No reaction because no step pulse has occurred. |
| 6. Counter Reset Cam closes contacts. | 6. Prime reset relay re-connected to battery. |

| Sequence | Reaction |
|---|---|
| 4TH REVOLUTION OF CAM SHAFT | |
| 1. Time Pulse Cam closes contacts. | 1. Relay A of first binary 35 energizes. |
| 2. Time Pulse Cam opens contacts. | 2. Relay B of first binary 35 energizes to energize first selector relay 55. Since a separable connector 95 is connected between the first terminal of set 70 on the time patch board and the third terminal of set 63, lead 61 is connected through the pyramidal arrangement of the selector contacts at this time, to the time terminal 3 of set 63 and step terminal 1, of set 70, on the time patch board and the now closed contacts 82 of step relay 1 to the low side of the coil of step relay 2. Since only prime relay A is energized at this time, step relay 2 can be pulsed when the step relay cam closes contacts, 65. |
| 3. Step Relay Cam closes contacts 65. | 3. Pulse repeating relay 64 energizes closing contacts 64a, thereby energizing prime reset relay 67 and closing contacts 67a. Also step relay 2 is energized through lead 61 and present path through selector, time patch board and closed contacts 82 of the first step relay. Contacts 80, 81, 82 of second step relay close, thereby the low side of the coils of speed selector relay 3, acceleration selector relay 6 and throttle position selector relay 4 are connected to ground by means of the separable connectors on the speed, acceleration and throttle position patch boards and closed contacts 80. However, these relays cannot be energized because there is already a relay energized in each selector set. Prime relay B cannot energize because the high side of its coil is held near ground potential by the closed contacts 81. |
| 4. Step Relay Cam opens contacts 65. | 4. Near ground potential is removed from contacts 81 of second step relay and prime relay B energizes, opening contacts 84 and thereby de-energizing step relay 1 and prime relay A. When contacts 80 of step relay 1 open, speed selector relay 1, acceleration selector relay 2, and throttle position selector relay 1 de-energize. As soon as their swingers of contacts 109 open from grounded contact, then speed selector relay 3, acceleration selector relay 6, and throttle position selector relay 4 are energized, thereby setting up the corresponding discrete levels of the corresponding operating conditions of the engine. At the same time, pulse repeating relay 64 drops out, the interrupter relay 42 energizes to break the connection at contacts 42a between common lead 41 and battery 43, so the relays of binary counter 15 and the relays of selector 16 all drop out to reset the time counting arrangement. |
| 5. Counter reset cam opens contacts. | 5. Reset relay pair drops out and puts counter 15 and selector 16 in "ready to operate" state. |
| 6. Counter reset cam closes contacts. | 6. Reset relay pair put in "ready to operate" state. |
| 5TH REVOLUTION OF CAM SHAFT | |
| 1. Time Pulse Cam closes contacts. | 1. A relay of first binary 35 energizes. |
| 2. Time Pulse Cam opens contacts. | 2. B relay of first binary 35 energizes to energize first selector relay 55. |
| 3. Step Relay Cam closes contacts. | 3. Since there is no connection from terminal 1 of terminals 63 to the third step relay there is no step pulse. |
| 4. Step Relay Cam closes contacts. | 4. No reaction because no step pulse has occurred. |
| 5. Counter Reset Cam opens contacts. | 5. No reaction because no step pulse has occurred. |
| 6. Counter Reset Cam closes contacts. | 6. Prime reset relay reconnected to battery. |
| 6TH REVOLUTION OF CAM SHAFT | |
| 1. Time Pulse Cam closes contacts. | 1. Relay A of first binary drops out to pulse relay A of second binary 36. |
| 2. Time Pulse Cam opens contacts. | 2. Relay B of first binary drops out to de-energize the first selector relay 55. Relay B of second binary energizes to energize the second selector relay 56. There is now a circuit from lead 61 through selector relays to 2nd terminal of set 63, to 2nd terminal of set 70 through contacts 82 of the second step relay and to the low side of the coil of step relay 3 and the step relay will be energized when a step pulse occurs. |

| Sequence | Reaction |
|---|---|
| 6TH REVOLUTION OF CAM SHAFT—Cont. | |
| 3. Step Relay Cam closes contacts. | 3. Pulse repeating relay 64 energizes thereby energizing prime reset relay 67. Also, step relay 3 is energized, establishing ground connections to a speed selector relay, an acceleration selector relay, and a throttle position selector relay. |
| 4. Step Relay Cam opens contacts. | 4. Near ground potential is removed from high side of prime relay C and it energizes, thereby dropping out step relay 2 and prime relay B, whereupon speed selector relay, acceleration selector relay, and throttle position relay grounded by step relay 3 are energized and another discrete level of the corresponding operating condition is established. At the same time pulse repeating relay 64 drops out and the interrupter relay 42 energizes, thereby dropping out the relays of binary counter 15 and the relays of selector 16 to reset the time counting arrangement. |
| 5. Counter Reset Cam opens contacts. | 5. Reset relay pair drops out, putting binary counter 15 and selector 16 in "ready to operate" state. |
| 6. Counter Reset Cam closes contacts. | 6. Reset relay pair put in "ready to operate" state. |

Though the controller is set up to achieve a further sequence of steps of the cycle or program, it should not be necessary to describe the operation of the various elements of the apparatus for each of these steps, since the operation should be evident from the above.

It will be evident from the above if $t$ is the period of rotation of shaft 11, that the first step and its levels of the operation conditions are maintained for $3t$ seconds, the operating conditions are maintained for $3t$ seconds, onds for any step being $nt$, where $n$ is the number of the set of terminals 63 of the time patch board connected to the terminal 70 which is connected to the contacts of the step relay corresponding to that step.

If indication of what step is operative at any instant is desired, each step relay may be provided with an indicating lamp energized through contacts of the relay when the relay is energized. Further, indicator lamps may similarly be provided for the binaries and the control relays for the same purpose. Trouble location may also be facilitated with such lamps.

It will be obvious that the various steps of the program can be selected, by appropriate connection of the connectors of the time patch board, to be maintained for any desired multiple of the primary time period of shaft 11 of the synchronous motor 10. Moreover, any desired arrangement of the condition controls may be made through selected connections of the speed patch board, the acceleration patch board, and the throttle position patch board. Thereby, the various levels of these characteristics of the device to be controlled, in this embodiment, an engine, may be attained in any desired sequence and for any desired interval of time. Of course, as many characteristics of as many levels as desired could be controlled, and the number of steps could be increased or decreased, by evident design changes.

It will be evident that many minor changes could be made in the apparatus described as the preferred embodiment of the invention. Most important is the fact that the controller principle here illustrated could be used to control any device which has operating characteristics capable of assuming a plurality of discrete levels. Moreover, the fundamental time of the apparatus could be measured by any suitable means other than a cam, such as a mechanical or an electrical pulse generator. Also, the basic time period need not be periodic, for when rotating machinery is to be controlled, the length of step time may be determined by number of rotations of the controlled machine. Further, the switching device which is illustrated as selector 16 in the disclosed embodiment can be any type of switching device which will provide a unique electrical current path for selected multiples of the basic or primary time period and which can be used to energize a step relay at the termination of each of the selected multiples of the primary time period.

In addition, any type of energizing device for providing a pulse of electrical current through the unique path of the switching device could be used, batteries obviously not being necessary. The only other important element of the apparatus that is absolutely necessary to the system is a resetting device which will be operated when the energizing device provides a pulse of current to the switching device to reset the switching device.

The switching device, which in the illustrated embodiment is a relay selector connected in pyramidal fashion, can be a magnetically-operated stepping switch, if desired. Moreover, the switching device could also include a plurality of gas or vacuum tubes wired as a counting system with a pyramidal, or "tree," or "matrix" connection to provide a plurality of unique paths through the pyramid or matrix for each count of the apparatus, there only being one in each path at any one time.

Also, it will be evident that patch boards are not absolutely necessary, because for some types of operation, switch boards in which separable connectors are not used but are replaced by double position switches, could be used. However, the flexibility of patch boards makes them preferable for most installations. The terms "patch board" and "plug board" are interchangeable for the purpose of this invention and may be used herein in that manner.

In view of all of the above changes that could be made in the apparatus specifically described without departure from the invention, the invention is not to be considered limited to the embodiment described, but only by the scope of the appended claims.

We claim:

1. A time pattern controller for sequentially selecting a different one of a plurality of discrete levels of a condition of a device to be controlled, comprising a plurality of sequentially energizable means each operable when energized to select a predetermined one of said discrete levels, a time patch board having one set of terminals each connected to a different one of said sequentially energizable means and another set of terminals, timing means operable to make a connection to progressive ones of said other set of terminals every $n$th second, where $n$ is any predetermined number, said timing means having a zero condition in which no connection is made, separable connectors for connecting the terminals of said one set to the terminals of said other set, means including said separable connectors, said time patch board and said timing means for energizing said sequentially energizable means at intervals of time determined by the terminals to which said separable connectors are connected, and means for resetting said timing means to zero condition each time one of said sequentially energizable means is energized.

2. A time patterns controller for sequentially selecting a different one of a plurality of discrete levels of a condition of a device to be controlled, comprising a timing switch device having a zero time condition and operable to assume a plurality of sequential time conditions such that at any instant it is in the time condition $nt$ where $t$ is the period of the timing element thereof and $n$ is the number of periods since the zero time condition, a plurality of step relays connected together for sequential energization and each operative when energized to select a predetermined one of said discrete levels, said switch device being operable to provide a unique current path sequentially to each of said step relays for selected values of $n$, energizing means operative when said unique path is provided to energize the corresponding step relay, and means for resetting said timing switch device to its zero time condition each time one of said step relays is energized.

3. A time pattern controller for sequentially selecting a different one of a plurality of discrete levels of a condition of a device to be controlled, comprising a counting chain, timing means operable to pulse said chain each cycle of the timing means, switch means having a plurality of operative conditions and being connected to said counting chain, said counting chain being operable to change the operative condition of the switch means each cycle of the timing means in sequential fashion, a plurality of step relays connected together for sequential operation and each operative when energized to select a predetermined one of said discrete levels, means for connecting said relays to said switch means in selectable fashion to provide a unique current path sequentially to each of said step relays for selected multiples of the cycle of the timing means, energizing means operative when said unique path is provided to energize the corresponding step relay, and means for resetting said switch means and said counting chain to their initial conditions each time one of said step relays is actuated.

4. A time pattern controller for sequentially selecting a different one of a plurality of discrete levels of a condition of a device to be controlled, comprising a binary counting chain, each binary comprising a pair of relays, a selector device comprising a plurality of relays having contacts connected in pyramidal arrangement with each relay connected to be energized in response to operation of one of the relays of a different one of the binaries, timing means operable to pulse the input binary each cycle of the timing means, a time patch board having one set of terminals connected each to a different one of the output contacts of the pyramidal connection of the selector contacts, said selector device being operable in response to continuous operation of the timing means and the counting chain to provide a unique current path to the terminals of said one set sequentially at $t$ time intervals, where $t$ is the period of the timing means, a plurality of step relays connected in sequential fashion and each operative when energized to select a predetermined one of said discrete levels, said step relays being connected to different ones of another set of terminals of the patch board, separable connectors adapted to be connected between selected ones of said one set and selected one of said other set of terminals, energizing means operative when said unique path is connected to a step relay to energize the step relay, and means for resetting the counting chain and selector device each time a step relay is energized.

5. A time pattern controller for sequentially selecting a different one of a plurality of discrete levels of a condition of a device to be controlled, comprising a binary counter including at least a first and a second binary, each binary comprising a pair of relays, timing means operable to pulse the first binary each cycle of the timing means, a selector device including at least a first and a second relay having their contacts connected in pyramidal arrangement, said first and second relays of the selector device being connected to one relay of the first and second binaries, respectively, to be energized when said one relay of the respective binary is energized, a time patch board having one set of terminals connected to the output contacts of the pyramidal connection of the selector contacts, said selector device being operable in response to continuous operation of the timing means and the binary counter to provide a unique current path to the terminals of said one set sequentially at $t$ time intervals, where $t$ is the period of the timing means, a step control device comprising a plurality of step relays connected in sequential fashion with each relay except the first connected through the normally-open contacts of the preceding relay to sequential ones of the terminals of another set on the time patch board, and with each relay operable when energized to deenergize the preceding relay and to select a different one of said discrete levels, separable connectors operable to connect selected ones of the first set of terminals of the time patch board to sequential ones of the second set of terminals, energizing means operative when a unique path is connected through the selector device and the time patch board to one of said relays of the step control device to energize that relay, start means connected to said energizing means for energizing the first relay of the step control device at the start of operation of the controller, and means for resetting the binary counter and selector device to their initial conditions each time one of the relays of the step control device is energized.

6. The apparatus of claim 5 in which said step control device includes $n$ prime relays and said relays of the step control device are arranged in groups of $n$, where $n$ is an integer, each prime relay having its energizing circuit including the normally open contacts of a different one of the relays of the different groups, and the energizing circuit of each step relay including the normally-closed contacts of the prime relay connected to its succeeding relay.

7. The apparatus of claim 6 including recycle switch means for connecting a selected prior one of said step relays to the normally open contacts of one of said step relays to permit the controller to repeat at least a portion of the sequence of operation of the controller after one sequence is completed.

8. A time pattern controller for sequentially selecting a different one of a plurality of discrete levels of a condition of a device to be controlled, comprising a constant speed shaft, a plurality of cams on said shaft, a pair of contacts for each cam closed once during each revolution of the shaft, a binary counter including a plurality of binaries each including a pair of relays, each binary except the first being controlled by the preceding binary and the first being controlled by a first one of said cams, each binary having an on and an off condition, a selector device including a relay for each binary connected thereto to be energized in response to the binary reaching its on condition, the relays of the selector device having a progressively-increasing number of poles of double-throw contacts connected in pyramidal arrangement, a time patch board having a first and a second set of terminals, the terminals of the first set being connected to the output contacts of the pyramidal arrangement of the selector relays, said selector device being operable in response to continuous operation of the timing means and the binary counter to provide a unique current path to the terminals of said first set sequentially at $t$ time intervals, where $t$ is the period of a rotation of the shaft, a step control device comprising a plurality of step relays with each relay except the first connected through the normally-open contacts of the preceding relay to separate terminals of the second set on the time patch board, and with each step relay operable when energized to de-energize the preceding relay and to select a different one of said discrete levels, separable connectors operable to connect selected one of the first set of terminals of the time patch board to sequential ones of the second set of terminals, energizing means connected through the contacts of a second one of said cams to the input pole of the pyramidal connection of the contacts of the selector relay, start means connected between the first of the step relays and the contacts of said second cam to energize the first relay and establish the first discrete level at the start of operation of the controller, and means including a third one of said cams operable to disconnect the relays of the binary counter from their energizing source to reset the counter and selector device to their initial conditions each time one of the relays of the step control device is energized.

9. A time pattern controller for control of a dynamometer to establish a program of operation of an engine controlled by the dynamometer, with the program consisting of a plurality of sequential steps each having its own discrete levels of a plurality of operating conditions of the engine, comprising a timing switch device having a zero time condition and operable to assume a plurality of sequential time conditions such that at any instant it is in time condition $nt$ where $t$ is the period of the timing element thereof and $n$ is the number of periods since zero time condition, a plurality of step relays connected together for sequential operation and each operative when energized to select a predetermined one of said discrete levels of said plurality of operating conditions, said switch device being operable to provide a unique current path sequentially to each of said step relays for selected values of $n$, energizing means operative when said unique path is provided to energize the corresponding step relay, and means for resetting said timing switch device to its zero time condition each time one of said step relays is energized.

10. A time pattern controller for control of a dynamometer to establish a program of operation of an engine controlled by the dynamometer, with the program consisting of a plurality of sequential steps each having its own discrete levels of a plurality of operating conditions of the engine, comprising a plurality of step relays connected together for sequential energization and each operable when energized to select a different one of said steps, a time patch board having one set of terminals each connected to a different one of said step relays and another set of terminals, timing means operable to make a connection to progressive ones of said other terminals every $n$th second, where $n$ is any predetermined number, separable connectors for connecting the terminals of said one set to the terminals of said other set, means including said separable connectors, said time patch board and said timing means for energizing said step relays at intervals of time determined by the terminals to which said separable connectors are connected, and means for resetting said timing means to its initial condition each time one of said step relays is energized.

11. The apparatus of claim 10 including a patch board for each of said operating conditions of the engine, a separate relay for controlling each of said discrete levels of each operating condition, with only one of the relays for each operating condition being energizable at any one time, the relays for the discrete levels being connected to different ones of one set of terminals of the patch board for their operating condition, normally-open contacts of each step relay being connected to corresponding different terminals of each of said last-mentioned patch boards, separable connectors for each patch board each operable to connect a selected one of said one set of terminals to a selected one of said other set of terminals, said step relays being operable when energized to complete an energizing circuit to each control relay connected to its said normally open contacts.

12. A time pattern controller for control of a dynamometer to establish a program of operation of an engine controlled by the dynamometer, with the program consisting of a plurality of sequential steps each having its own discrete levels of a plurailty of operating conditions of the engine, comprising a plurality of sequentially energizable step relays each operable when energized to select a different one of said steps, a timing device, switch means connected to said timing device for timed control thereby, said switch means comprising a plurality of relays having their contacts connected in pyramidal fashion, means connected to the input contact of the pyramidal arrangement for energizing the step relays, a time patch board having one set of terminals connected each to a different one of the output terminals of the pyramidal arrangement, another set of terminals on the path board each connected to a different one of said step relays, separable connectors for connecting selected ones of said one set of terminals to the other set of terminals, said timing device, said switch means and said time patch board with its connectors being operable to establish a unique current path between said energizing means and sequential ones of said step relays for selected multiples of the time period of the timing device determined by the positions of the connectors connected to sequential ones of the step relays, and means for resetting the switch means to its initial condition after each energization of a step relay.

13. A time pattern controller for control of a dynamometer to establish a program of operation of an engine controlled by the dynamometer, with the program consisting of a plurality of sequential steps each having its own discrete levels of a plurality of operating conditions of the engine, comprising a control relay for each discrete level of each operating condition of the engine operable when energized to establish its discrete level, relay energizing means, a patch board for each operating condition of the engine having one set of terminals each connected to a different one of the control relays of that operating condition, a step control comprising a plurality of step relays connected to be energizable only in sequence with each relay being operable when energized to de-energize the preceding relay and operable to complete a connection between said energizing means and a different one of the terminals of another set on each operating condition patch board, separable connectors for connecting the terminals of said one set to the terminals of said other set on each of said operating condition patch boards, a binary counter comprising a plurality of chain-connected binaries each having an on and an off condition, timing means for changing the count of the input binary once every $t$ seconds, where $t$ is any predetermined number, a selector device including a plurality of selector relays each connected to a different one of said binaries for energization when the associated binary is in its on condition, the selector relays having a number of poles of double throw contacts corresponding to the number of its associated binary, with the selector relay contacts connected in pyramidal arrangement, a time patch board having a first and a second set of terminals, the input pole of the pyramidal arrangement of selector contacts being connected to said relay energizing means and the output contacts of the pyramidal arrangement being connected to different ones of said first set of terminals of the time patch board, the second set of terminals of the time patch board being each connected to a different one of the step relays except the first step relay, start means for energizing said first step relay, separable connectors for connecting selected terminals of the first set to selected terminals of the second set on the time patch board, said selector relay contacts being operable to establish sequentially a unique current path to each of the first set of terminals of the time patch board and being operable when a connector connects one of the first set of terminals to one of the second set of terminals to complete an energizing circuit for the step relay connected to that one of the second set of terminals, means for resetting the binaries of the binary counter to their initial conditions each time a step relay is energized to thereby reset the selector relays to their initial conditions.

14. A time pattern controller for sequentially selecting predetermined ones of a plurality of discrete levels of a condition of a device to be controlled, comprising a counting switch device having a plurality of operative conditions, timing means operable cyclically to pulse said switch device to change the operative condition thereof sequentially, a plurality of step relays connected together for sequential energization and each operative when energized to select a predetermined one of said discrete levels, means for connecting said switch device to said step relays in selectable fashion to provide a unique current path sequentially to each of said step relays for selecting multiples of the timing cycle, energizing means operable each time said path is provided to energize the corresponding step relay, and means for resetting said switch device to its initial condition each time one of said step relays is actuated.

15. A time pattern controller for sequentially selecting predetermined ones of a plurality of discrete levels of a condition of a device to be controlled, comprising a counting switch device having a plurality of operative conditions, timing means operatively cyclically to pulse said switch device to change the operative condition thereof sequentially, a step selector having a plurality of sequential operative conditions in each of which a predetermined one of said discrete levels is selected, said step selector having a plurality of input terminals, said switch device having an input terminal and a plurality of output terminals and being operable to establish a current path between its input terminal and a different one of its output terminals in each of its operative conditions, separable connectors for connecting sequential ones of the input terminals of said step selector to preselected ones of the output terminals of said switch device, energizing means connected to the input terminal of said switch device and to said step selector operable each time a current path is established between the input terminal of said switch device and sequential ones of the input terminals of said step selector to change the operative condition of said step selector sequentially, and means for resetting said switch device to its initial condition each time the operative condition of said step selector is changed.

16. A time pattern controller for sequentially selecting predetermined ones of a plurality of discrete levels of a condition of a device to be controlled, comprising a step selector including a plurality of switches each operable when operated to set up a predetermined one of said discrete levels, a plurality of switch-operating means, one for each switch, and means connecting said operating means together for sequential operation, said operating means each having an input terminal; an electrical pulse counting switch device including a primary pulsing device for furnishing primary cyclic electrical pulses, said switching device having a common input terminal and a plurality of output terminals and being operable sequentially to set up a unique current path between its said input terminal and sequential ones of said output terminals upon arrival of sequential pulses from said primary pulsing device, means for connecting selected ones of said output terminals to sequential input terminals of said operating means; a secondary pulsing device for furnishing secondary cyclic electrical pulses of the same period as said primary pulses but delayed with respect thereto, said secondary pulsing device being connected to said input terminal and to said operating means to furnish an operating pulse for one of said operating means each time a current path is set up between said common input terminal and the proper sesquential one of said operating means, and resetting means for said pulse counting switch device operable to return it to its zero time condition each time a current pulse is sent through said unique current path.

17. The apparatus of claim 16 in which said step selector includes a plurality of step relays having control and auxiliary contacts, the control contacts thereof being said plurality of switches and the operating coils thereof being said plurality of switch-operating means; said means connecting said operating means together including control relays and said auxiliary contacts connected together to energize sequential ones of the step relays each time a secondary pulse is received by said step selector, sequential ones of the input terminals of said step selector being connected to sequential ones of said step relays through auxiliary contacts of the preceding relays.

18. The apparatus of claim 16 including a condition controlling device comprising a plurality of level selector devices and means for connecting successive ones of the switches of said step selector to selected ones of said level selector devices, said connecting means being operable to operate a level selector device each time one of said switches is operated.

19. A time pattern controller for sequentially selecting predetermined ones of a plurality of discrete levels of a condition of a device to be controlled, comprising a primary electrical pulsing device operative cyclically to provide an electrical pulse at its output, a counting switching device connected to the output of said primary pulsing device and having an input terminal and a plurality of output terminals, said switching device being operable to connect its input terminal to sequential ones of its output terminals upon receipt of sequential pulses from said primary pulsing device, a step selector having a plurality of sequential operative conditions in which it selects different ones of said discrete levels, said step selector having a plurality of sequential input terminals, one for each of its operative conditions, separable connectors for connecting selected ones of the output terminals of said switching device to sequential ones of the input terminals of said step selector, a secondary electrical pulsing device operative cyclically with said primary pulsing device to change the operative conditions of said step selector sequentially when a current path between the input terminal of the switching device and the next sequential input terminal of the step selector exists, and a reset device operable each time the operative condition of said step selector is changed to reset said switching device to its initial condition.

References Cited in the file of this patent

UNITED STATES PATENTS

| | | |
|---|---|---|
| 1,984,688 | Murray | Dec. 18, 1934 |
| 2,799,811 | Lindars | July 16, 1957 |
| 2,811,202 | Schild et al. | Oct. 29, 1957 |